(12) United States Patent
Kouhara et al.

(10) Patent No.: US 7,173,789 B2
(45) Date of Patent: Feb. 6, 2007

(54) HEAD POSITION CALCULATION METHOD IN MAGNETIC DISC APPARATUS

(75) Inventors: Shinichirou Kouhara, Hino (JP); Masahide Yatsu, Akishima (JP); Masafumi Iwashiro, Ome (JP); Hideo Sado, Ome (JP); Seiji Mizukoshi, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/262,896

(22) Filed: Nov. 1, 2005

(65) Prior Publication Data

US 2006/0221491 A1  Oct. 5, 2006

(30) Foreign Application Priority Data

Mar. 30, 2005  (JP) ............................. 2005-098264

(51) Int. Cl.
    *G11B 21/02* (2006.01)
(52) U.S. Cl. ...................................................... 360/75
(58) Field of Classification Search ...................... None
    See application file for complete search history.

(56) References Cited

U.S. PATENT DOCUMENTS

| 5,801,897 | A | | 9/1998 | Kanda et al. |
| 5,825,580 | A | * | 10/1998 | Shibata ..................... 360/77.08 |
| 5,847,527 | A | | 12/1998 | Iwashiro |
| 5,867,341 | A | * | 2/1999 | Volz et al. ................ 360/77.08 |
| 5,982,173 | A | | 11/1999 | Hagen |
| 6,046,879 | A | * | 4/2000 | Hampshire ............... 360/77.08 |
| 6,175,465 | B1 | | 1/2001 | Kawachi et al. |
| 6,369,971 | B1 | | 4/2002 | Everett |
| 6,369,974 | B1 | * | 4/2002 | Asgari et al. ............. 360/78.14 |
| 6,687,079 | B1 | * | 2/2004 | Zhang ....................... 360/77.08 |
| 6,760,185 | B1 | * | 7/2004 | Roth et al. ................ 360/77.08 |
| 2005/0270686 | A1 | | 12/2005 | Kisaka |

FOREIGN PATENT DOCUMENTS

| EP | 0 785 542 B1 | 3/2004 |
| JP | 08-249843 | 9/1996 |
| JP | 09-282818 | 10/1997 |

\* cited by examiner

*Primary Examiner*—K. Wong
(74) *Attorney, Agent, or Firm*—Pillsbury Winthrop Shaw Pittman LLP

(57) ABSTRACT

When a sub-track having burst data A and D, a sub-track having burst data A and C, a sub-track having burst data B and C, and sub-track having burst data B and D are repeatedly arranged in this order, in accordance with equations 1 and 2, a sub-track t included in a track T determines the value of a constant n within a range of 1.2 (inclusive) to 1.8 (inclusive) so as to obtain linearity between a position in a disc radial direction r and a head position P in a disc radial direction r in the sub-track t. Subsequently, the head position P is calculated using the determined constant n and equations 1 and 2:

$$P=(A-B)*|A-B|^{(n-1)}/(|A-B|^n+|C-D|^n) \quad (1)$$

$$P=(C-D)*|C-D|^{(n-1)}/(|A-B|^n+|C-D|^n) \quad (2)$$

2 Claims, 6 Drawing Sheets

HEAD POSITION CALCULATION METHOD IN MAGNETIC DISC APPARATUS

CROSS-REFERENCE TO RELATED APPLICATIONS

This application is based upon and claims the benefit of priority from prior Japanese Patent Application No. 2005-098264, filed Mar. 30, 2005, the entire contents of which are incorporated herein by reference.

BACKGROUND OF THE INVENTION

1. Field of the Invention

The present invention relates to a magnetic disc apparatus such as a hard disc apparatus and, more particularly, to a method of calculating a head position on the basis of burst data recorded in advance on a disc.

2. Description of the Related Art

For example, a magnetic disc apparatus 10 such as a hard disc apparatus generally has an arrangement shown in FIG. 1.

That is, the magnetic disc apparatus 10 of this type includes a motor 13, a medium 12 attached to the motor 13, a carriage 15, a head 14 attached to the carriage 15, and a voice coil motor 16. Information is written to the medium 12 using the head 14, and read from the medium 12 using the head 14. The head 14 is driven to move via the carriage 15 by the voice coil motor 16 on the basis of servo information 17 written on the medium 12. That is, the read/write head 14 can obtain the information pertaining to its current position on the medium 12 on the basis of the servo information 17.

BRIEF SUMMARY OF THE INVENTION

According to an embodiment of, the present invention, a method comprises calculating a position of a head in a magnetic disc apparatus which has each of annular tracks as a unit of a recording area on a disc, performs positioning control of the head within a tack range on the basis of four burst data A, B, C, and D recorded in advance in the tracks, and records/plays back data in/from the tracks using the head. Note that each of the tracks includes a plurality of annular sub-tracks in combination. Each of the sub-tracks always has only two of the burst data A, B, C, and D. The sub-track having the burst data A and D, the sub-track having the burst data A and C, the sub-track having the burst data B and C, and the sub-track having the burst data B and D are repeatedly arranged in this order. In this case, in accordance with equations (1) and (2), a value of a constant n is determined within a range of 1.2 (inclusive) to 1.8 (inclusive) so as to obtain linearity between a position in a radial direction of the disc and a position P of the head in the radial direction of the disc in the sub-track. The position P of the head is then calculated using the determined constant n and equations 1 and 2:

$$P=(A-B)*|A-B|^{(n-1)}/(|A-B|^n+|C-D|^n) \quad (1)$$

$$P=(C-D)*|C-D|^{(n-1)}/(|A-B|^n+|C-D|^n) \quad (2)$$

Note that the constant n is determined for each length of a component which is parallel to the disc surface and along the disc radial direction of the head.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

The best mode for carrying out the present invention will be described below with reference to the accompanying drawing.

Figure 1:
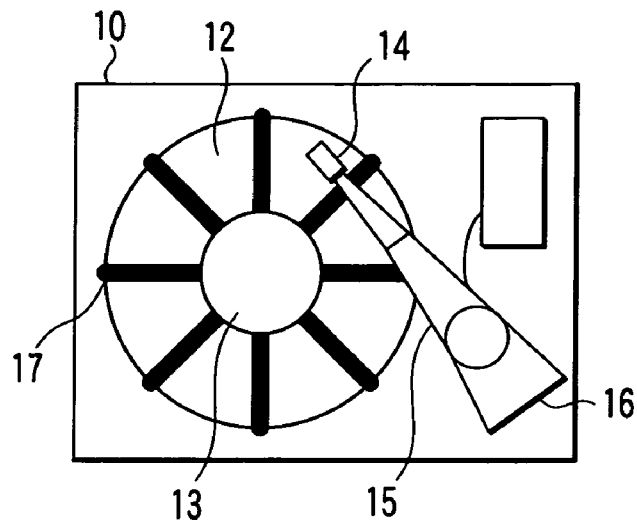
FIG. 1 is a schematic view showing a general arrangement of a magnetic disc apparatus.

Note that the same reference numerals in this embodiment denote the same parts as in FIG. 1.

Figure 2:
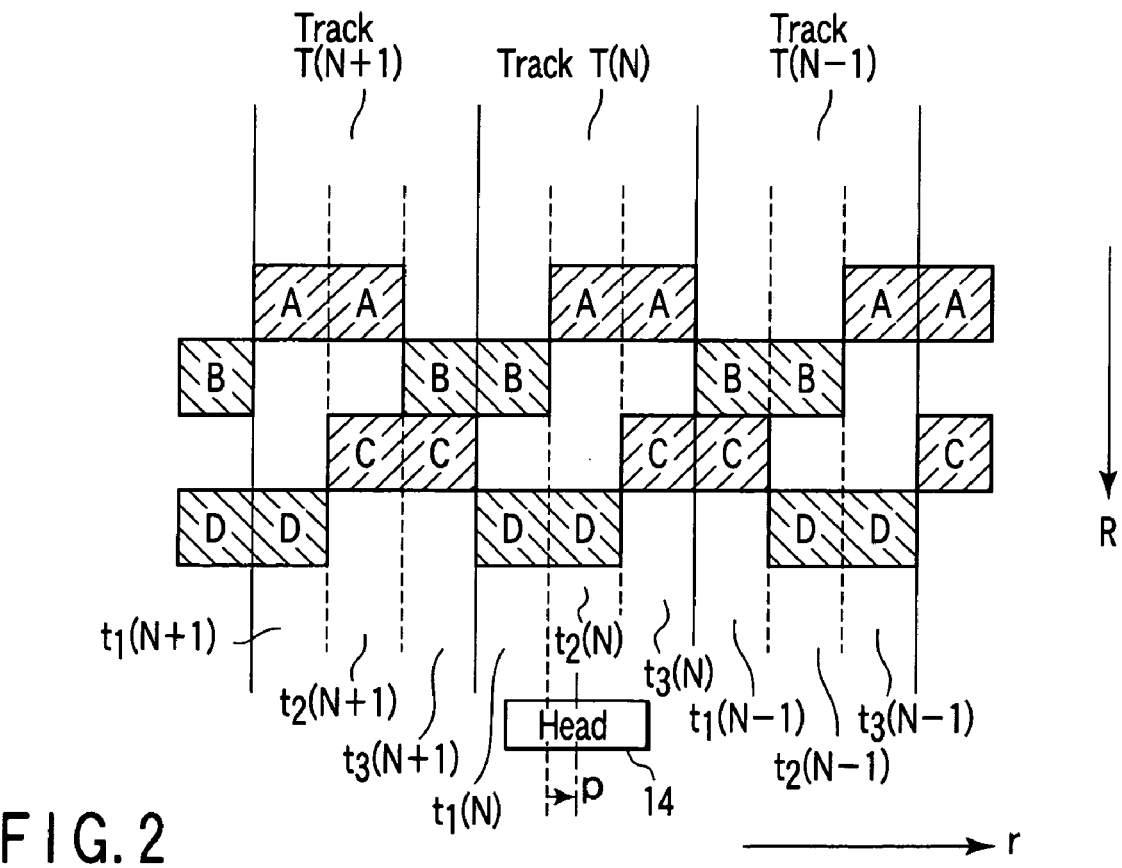
FIG. 2 is a view showing an example of a burst pattern.

On a medium 12 shown in FIG. 1, a burst data pattern shown in FIG. 2 is recorded in advance in each track T ( . . . , T(N−1), T(N), T(N+1), . . . ) to perform the positioning calculation of a head 14. This burst data pattern includes burst data A, B, C, and D. The track T includes a plurality of annular sub-tracks t (e.g., $t_1$ to $t_3$) in combination. Each of the sub-tracks t always has only two of burst data A, B, C, and D. The sub-track having burst data A and D, the sub-track having burst data A and C, the sub-track having burst data B and C, and the sub-track having burst data B and D are repeatedly arranged in this order. When performing the positioning process of the head 14, these burst data are read by the head 14, and a head position detection calculation is performed using the read burst signal, thereby detecting the position of the head 14 along the disc radial direction r in the sub-track t.

Figure 3:
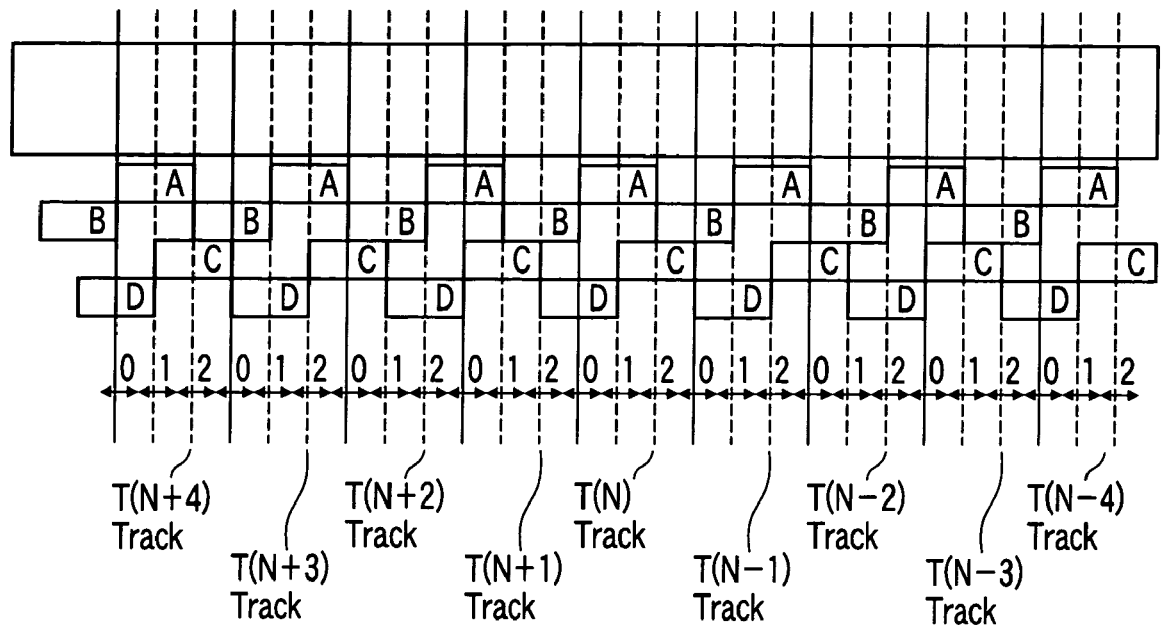
FIG. 3 is a conceptual view of a track format for explaining a head positioning process on a medium.

More specifically, for example, as disclosed in Jpn. Pat. Appln. KOKAI Publication No. 9-282818, as shown in FIG. 3, a target track T to be positioned is assumed as a cylinder code (N). First, when a position range is (0), bit 0 of the cylinder code (N) is confirmed. When bit 0 is "0", the head position is determined to be an even cylinder, and a burst calculation is performed using a calculation expression (B−A)/(B+A). Alternatively, when bit 0 is "1", the head position is determined to be an odd cylinder, and the burst calculation is performed using a calculation expression (D−C)/(D+C).

However, in this head position calculation, the following problem arises.

That is, in the head position calculation disclosed in Jpn. Pat. Appln. KOKAI Publication No. 9-282818, two types of calculation expressions must be properly used depending on whether the head position is an even or odd cylinder.

Figure 4:
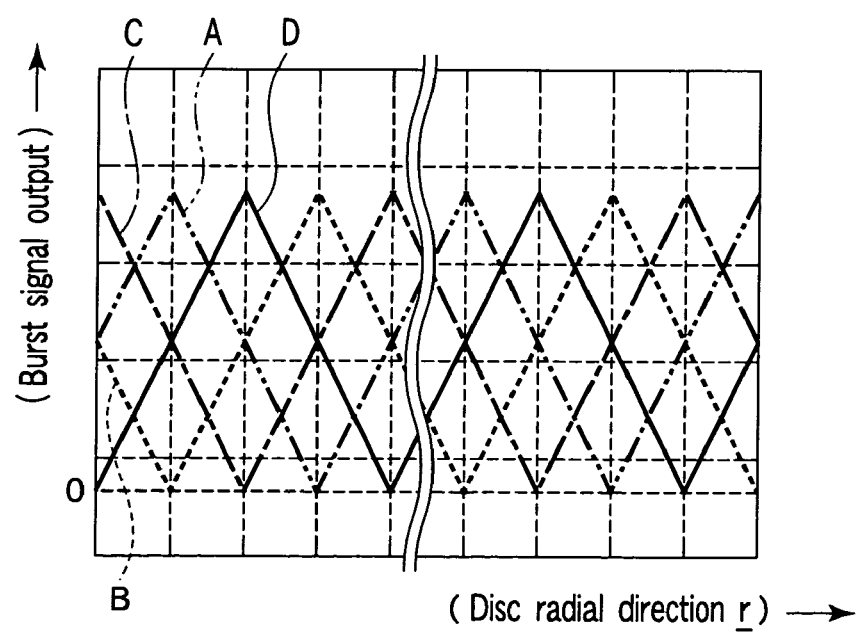
FIG. 4 is a graph showing an example of the output characteristic of an ideal burst signal.

As shown in FIG. 4, the burst data ideally has an output characteristic so as to form the triangular wave of the burst signal along the Y-axis with respect to the disc radial direction (track direction) along the X-axis.

Figure 5:
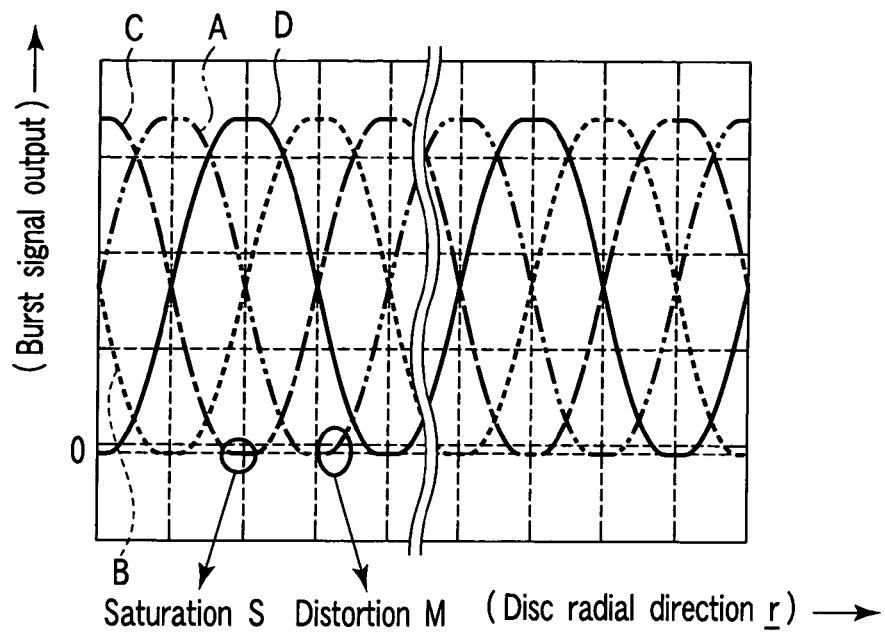
FIG. 5 is a graph showing an example of the output characteristic of a burst signal with saturation and distortion.
Figure 6:
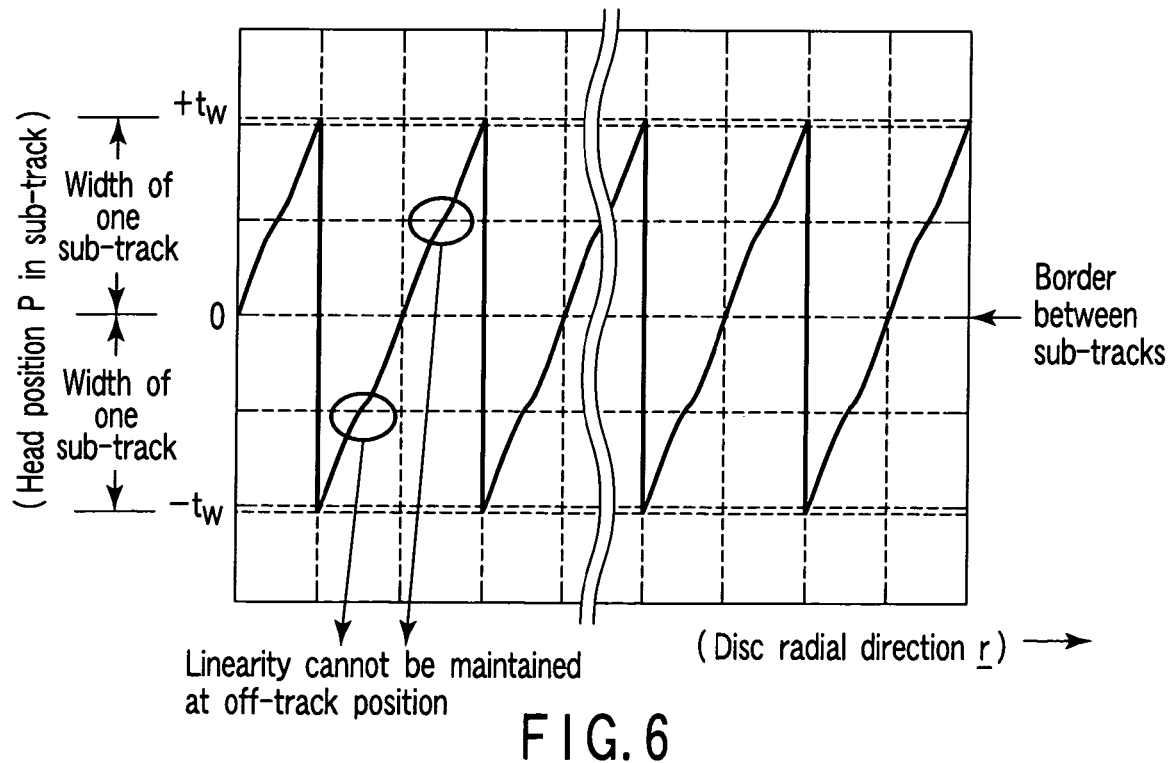
FIG. 6 is a graph showing an example wherein linearity between a disc radial direction and a head position along the disc radial direction in a sub-track is not maintained.

However, as shown in FIG. 5, the actual magnetic disc apparatus has the output characteristics such as saturation S and distortion M by various factors. When the positioning calculation of the head 14 is performed using the burst signal having these output characteristics, the position is influenced by the saturation S and distortion M. As shown in FIG. 6, linearity between the disc radial direction r along the X-axis and the head position along the Y-axis cannot be maintained at an off-track position.

Hence, depending on the position of the track T, the head position calculation precision can decrease, and the position of the head 14 can be misidentified.

Figure 7:
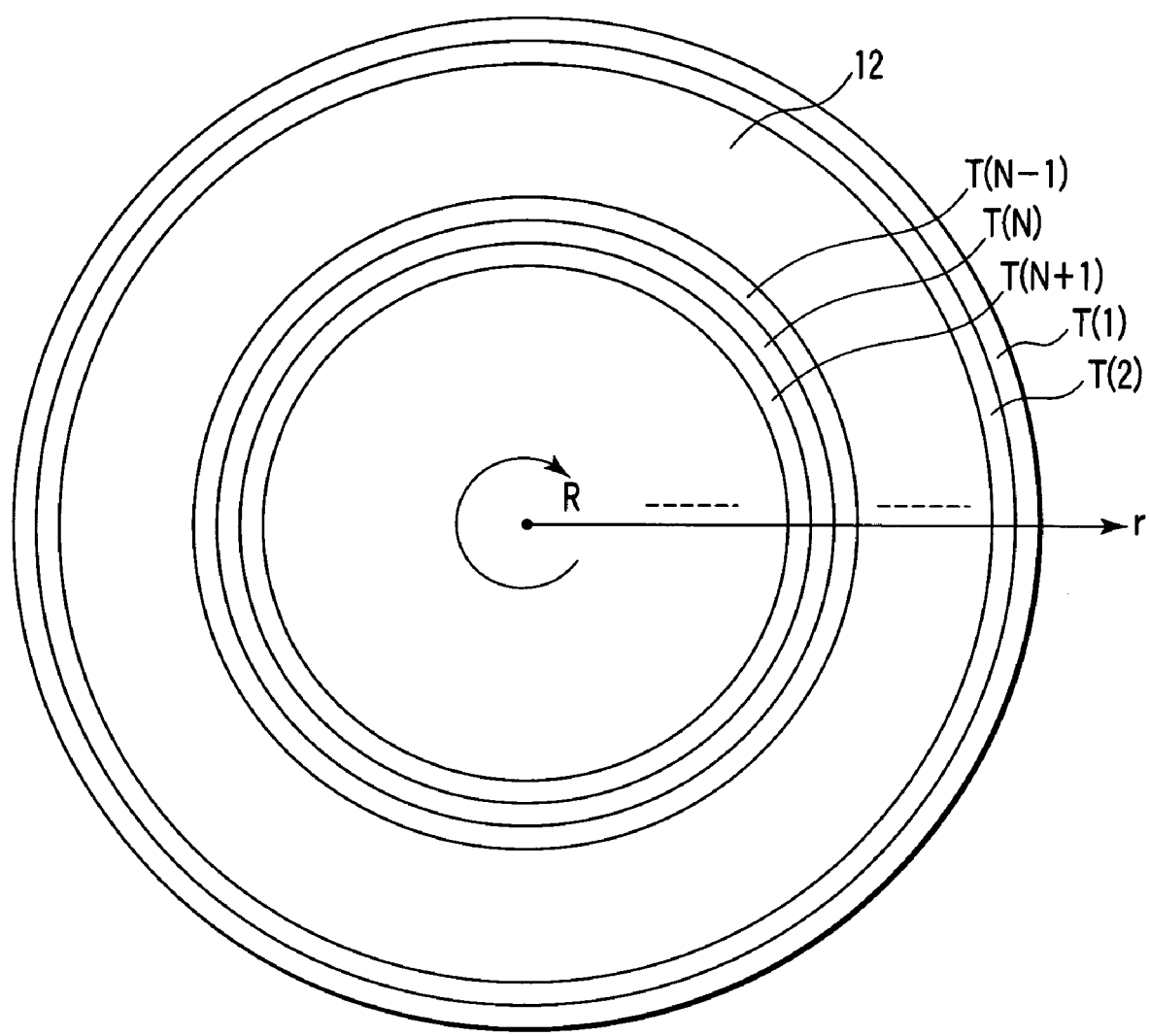
FIG. 7 is a conceptual view showing annular tracks on the medium.

Accordingly, in the head position calculation method according to the embodiment of the present invention, as shown in FIG. 7, each of the annular tracks T (T(1), T(2), . . . , T(N−1), T(N), T(N+1), . . . ) on the medium 12 is used as a unit of a recording area. As shown in FIG. 2, the positioning control of the head 14 is performed in the range of the track T on the basis of the four burst data A, B, C, and D recorded in advance in the track T. The position of the head 14 in the magnetic disc apparatus which records/plays back the data in/from the track T using the head 14 is then calculated.

In this case, as shown in FIG. 2, the track T includes the plurality of annular sub-tracks $t_1$, $t_2$, and $t_3$ in combination. FIG. 2 shows an example wherein the track T includes the three sub-tracks $t_1$, $t_2$, and $t_3$ from the inner peripheral portion of the disc. However, the present invention is not limited to this. The number of sub-tracks may be set to other than three.

Each of the sub-tracks t always has only two of the burst data A, B, C, and D. The sub-track t (e.g., sub-track $t_1$ (N+1)) having burst data A and D, the sub-track t (e.g., sub-track $t_2$ (N+1)) having burst data A and C, the sub-track t (e.g., sub-track $t_3$ (N+1)) having burst data B and C, and the sub-track t (e.g., sub-track $t_1$ (N)) having burst data B and D are repeatedly arranged in this order from the inner peripheral side.

In accordance with equations 1 and 2, the value of constant n falls within the range of 1.2 (inclusive) to 1.8 (inclusive) so as to obtain linearity between the position in the disc radial direction r and the head position P along the disc radial direction r in the sub-track t. The position P of the head 14 is then calculated using the determined constant n and equations 1 and 2:

$$P=(A-B)*|A-B|^{(n-1)}/(|A-B|^n+|C-D|^n) \quad (1)$$

$$P=(C-D)*|C-D|^{(n-1)}/(|A-B|^n+|C-D|^n) \quad (2)$$

Figure 8A:
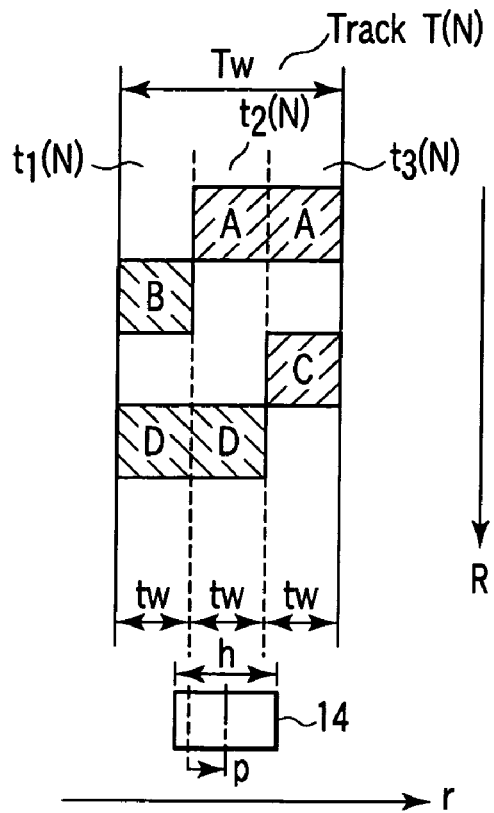
FIG. 8A is a view showing an example of a relationship between a track width and a head effective length.
Figure 8B:
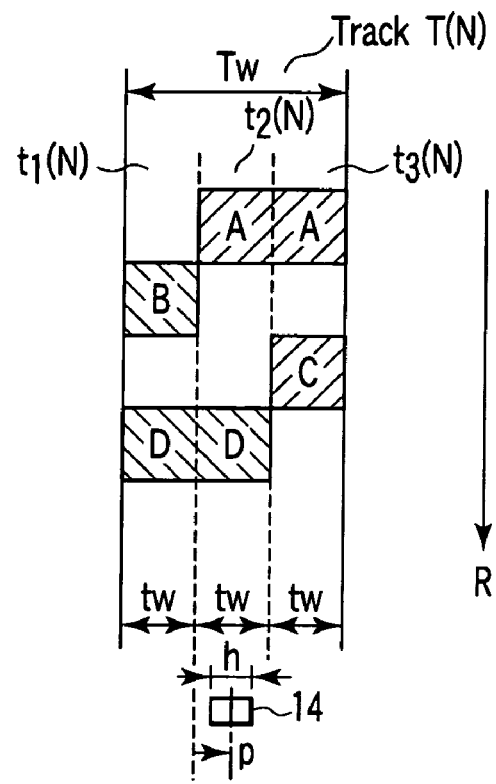
FIG. 8B is a view showing an example of the relationship between the track width and the head effective length.

Note that the constant n is determined for each length (head effective length) of the component which is parallel to a disc surface and along the disc radial direction r of the head 14. The reason for determining the constant n for each head effective length will be described as follows. That is, in order to obtain the ideal burst signal output characteristic as shown in FIG. 4, the head effective length h must be greater than the width $t_W$ of one sub-track t as shown in FIG. 8A. For example, as shown in FIG. 8B, when the head effective length h is less than the width $t_W$ of one sub-track t, a region in which only the burst data in the single sub-track t can be read is generated. As a result, as shown in FIG. 5, the output value of the burst signal does not change even when the disc radial direction r changes, and the saturation S and distortion M are generated.

Alternatively, the head effective length h must be equal to or less than the width $T_W$ of the track T. However, the more the head effective length h approximates to the width $T_W$ of the track T, the more the data is influenced by the burst data in an adjacent track T. As a result, the position calculation precision decreases.

Figure 9:
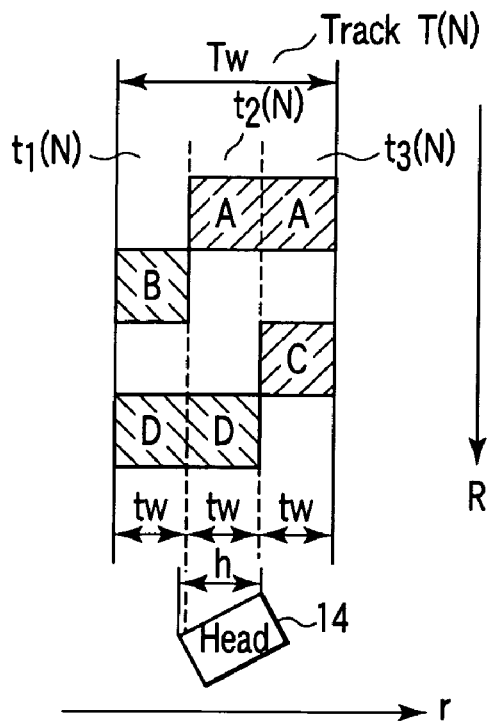
FIG. 9 is a view showing an example of the relationship between the track width and the head effective length.

From the above viewpoint, actually, the head effective length h is designed to be greater than the sub-track width $t_W$, and less than 1.5 times the sub-track width $t_W$. Note that since the disc is annular and the head 14 is rectangular, as shown in FIGS. 8A and 8B, the front surface of the head 14 is not always parallel to the disc radial direction r in the track T. As shown in FIG. 9, in a given track T, the head 14 tilts with respect to the disc radial direction r, and the head effective length h decreases. Accordingly, actually, in consideration of this tilt, the head effective length h is designed to be greater than the sub-track width $t_W$, and less than 1.5 times the sub-track width $t_W$ in any track T.

Figure 10:
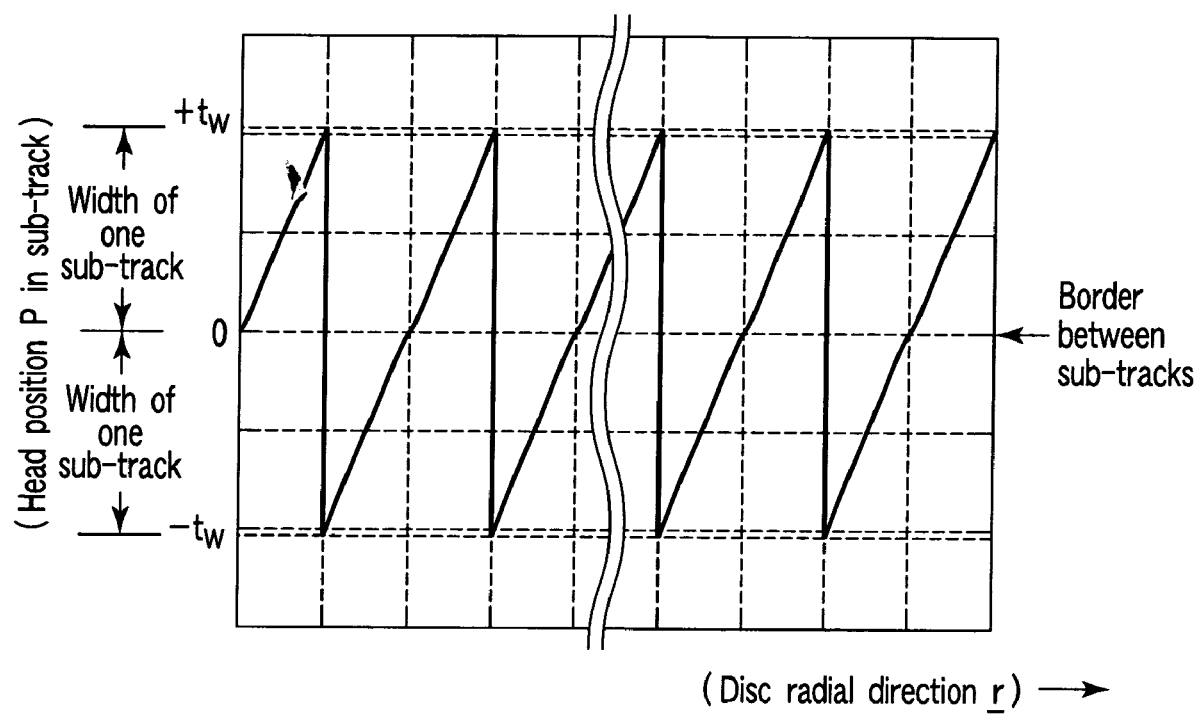
FIG. 10 is a graph showing a relationship in which linearity between the disc radial direction and the head position along the disc radial direction in the sub-track is maintained.

In the head effective length h, the value of the constant n falls within the range of 1.2 (inclusive) to 1.8 (inclusive) in equations 1 and 2. When the constant n is changed in this range to obtain the relationship between the disc radial direction r (track direction) and the head position P along the disc radial direction r in the sub-track t, as shown in FIG. 10, the characteristic to maintain linearity between the disc radial direction r along the X-axis, and the head position P along the disc radial direction r in the sub-track t along the Y-axis can be obtained. Note that the characteristic shown in FIG. 10 is obtained under the condition that the sub-track width=$t_W$, the head effective length h=4/3 $t_W$, and the constant n=$\sqrt{2}$.

As described above, since linearity between the disc radial direction r and the head position P along the disc radial direction r in the sub-track t is obtained, the head position detection can be stably performed regardless of the track T wherein the head 14 is positioned. That is, the positioning process can be stably performed regardless of the head position (on-track, off-track).

As described above, in the head position calculation method according to the embodiment, the constant n is so determined as to obtain linearity of the head position detection result using equations 1 and 2, and the head position is calculated using the constant n in equations 1 and 2. As a result, the head position can be calculated with high precision regardless of the head position (on-track and off-track), thus performing the stable head positioning process.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A method of calculating a position of a head in a magnetic disc apparatus which has each of annular tracks as a unit of a recording area on a disc, performs positioning control of the head within a track range on the basis of four burst data A, B, C, and D recorded in advance in the tracks, and records/plays back data in/from the tracks using the head, the method comprising:

when each of the tracks includes a plurality of annular sub-tracks in combination, each of the sub-tracks always has only two of the burst data A, B, C, and D, and the sub-track having burst data A and D, the sub-track having burst data A and C, the sub-track having burst data B and C, and the sub-track having burst data B and D are repeatedly arranged in an order named, in accordance with equations 1 and 2, determining a value of a constant n within a range of 1.2 (inclusive) to 1.8 (inclusive) so as to obtain linearity between a position in a radial direction of the disc and a position P of the head in the radial direction of the disc in the sub-track, and calculating the position P of the head using the determined constant n and equations 1 and 2:

$$P=(A-B)*|A-B|^{(n-1)}/(|A-B|^n+|C-D|^n) \qquad (1)$$

$$P=(C-D)*|C-D|^{(n-1)}/(|A-B|^n+|C-D|^n). \qquad (2)$$

2. A method according to claim 1, further comprising determining the constant n for each length of a component which is parallel to a disc surface and along the disc radial direction of the head.

* * * * *